March 20, 1928.                                                1,662,839
E. TYDEN
DRY PIPE VALVE ACCELERATOR
Original Filed Feb. 4, 1925      5 Sheets-Sheet 1

Witness
H. O. McKnight

Inventor
Emil Tyden
by Burton & Burton
his Attorneys.

March 20, 1928.  1,662,839

E. TYDEN

DRY PIPE VALVE ACCELERATOR

Original Filed Feb. 4, 1925   5 Sheets-Sheet 2

Inventor.
Emil Tyden.
by Burton & Burton
his Attorneys

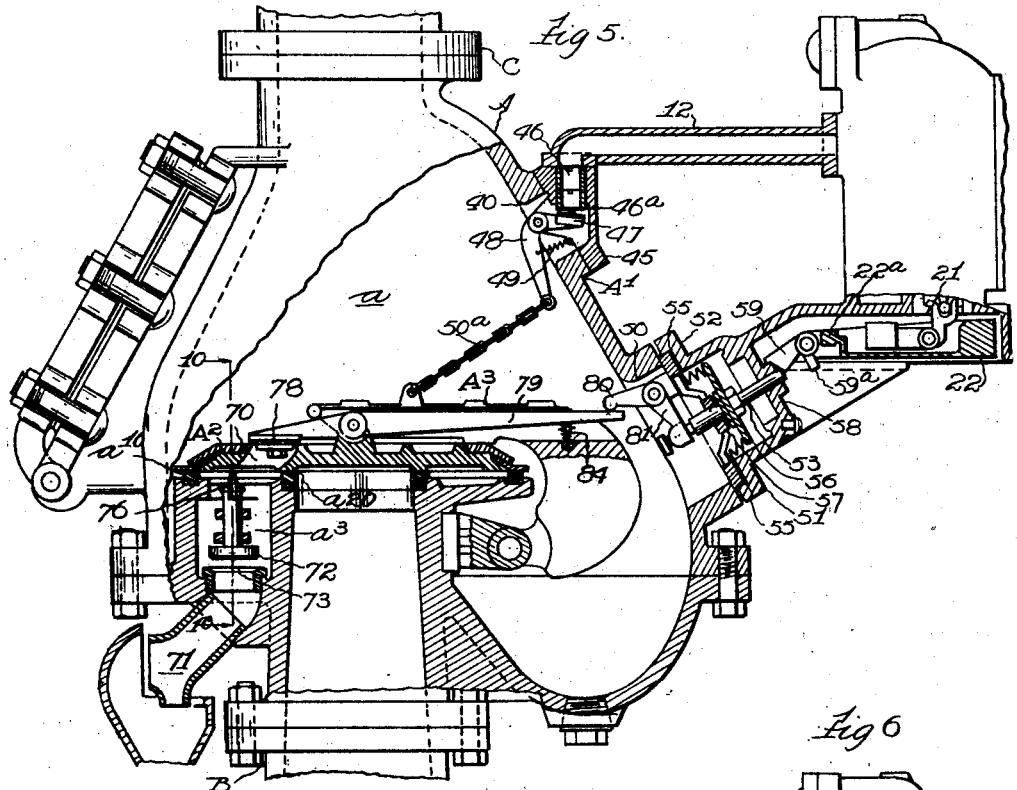

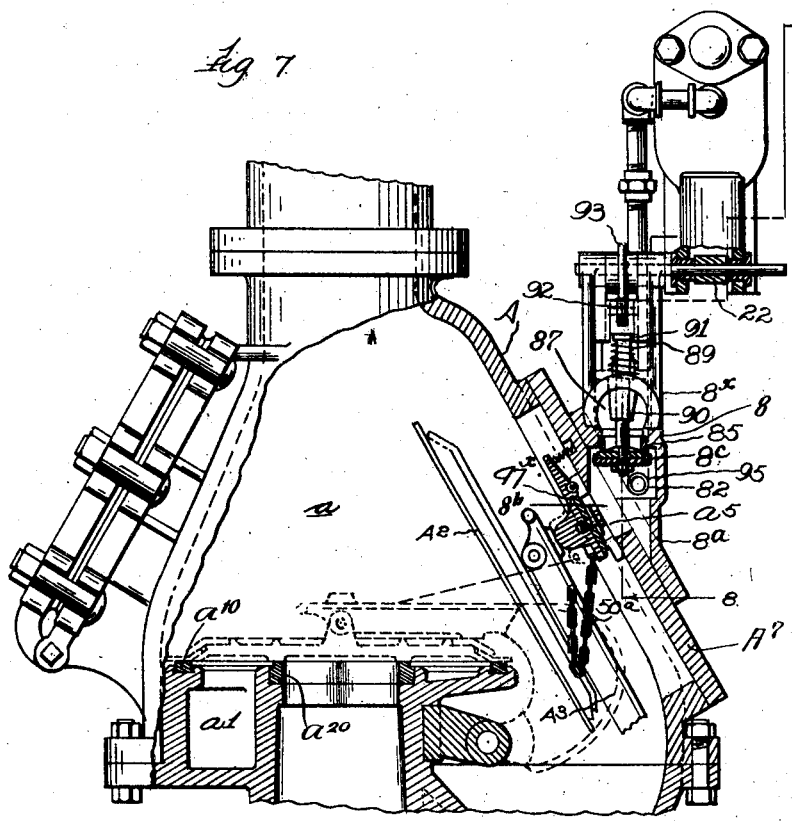
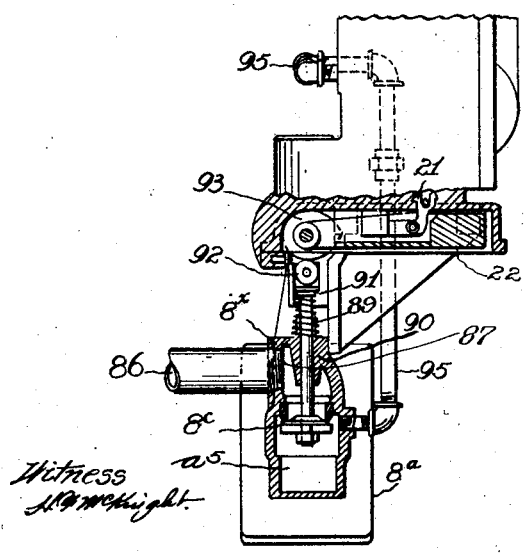

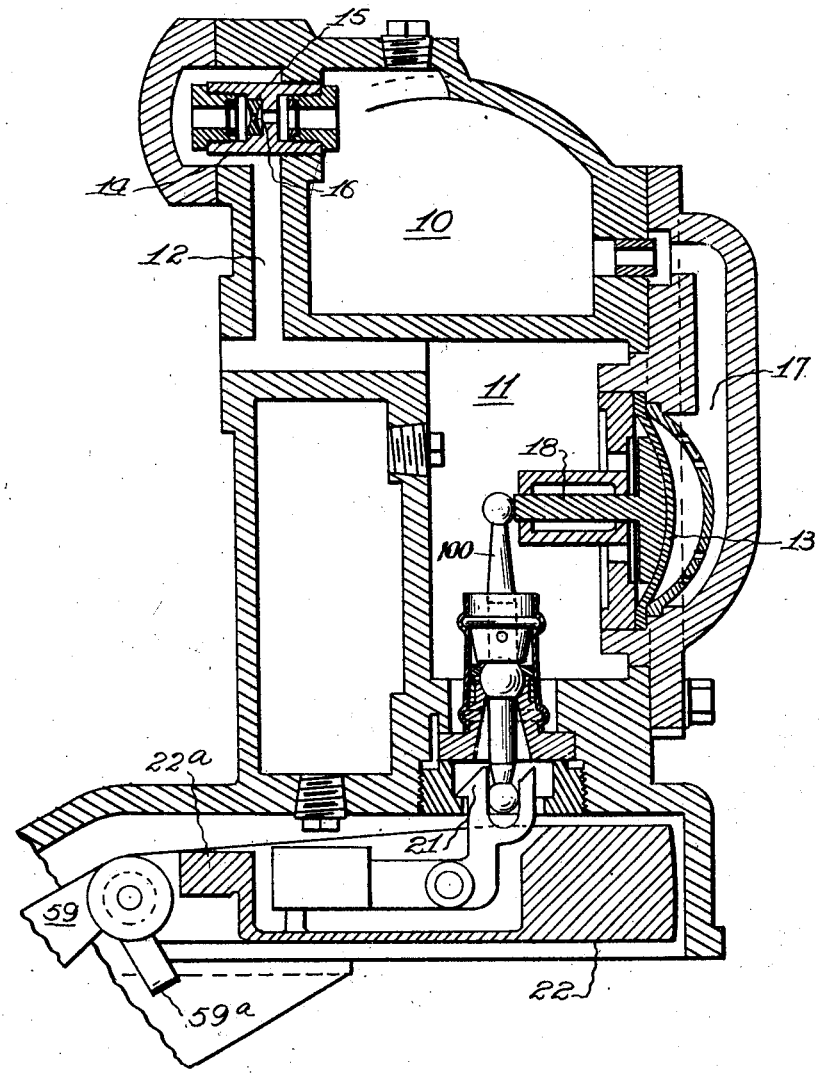

Patented Mar. 20, 1928.

1,662,839

UNITED STATES PATENT OFFICE.

EMIL TYDEN, OF EVANSTON, ILLINOIS.

DRY-PIPE-VALVE ACCELERATOR.

Application filed February 4, 1925, Serial No. 6,675. Renewed July 31, 1926.

The purpose of this invention is to provide an improved means for connecting and operating an accelerating device for a dry pipe sprinkler system. It consists in the elements and features of construction shown and described as indicated in the claims.

In the drawings:—

Figure 5 is a view similar to Figure 3 showing a modified form of one feature of the construction.

Figure 6 is a detail sectional view of a portion of the structure shown in Figure 5 having the moving parts in different positions from those shown in Figure 5.

Figure 7 is a view similar to Figures 3 and 5 showing a modification with respect to the location and connection of the vent passage and valve for venting the system pressure and means for operating said valves.

Figure 8 is a section at the line 8—8 on Figure 7.

Figure 9 is a section axial with respect to the air passages thereof of the accelerating device common to all the different forms shown in the preceding figures and shown therein only by an outside elevation of the casing.

Figure 10 is a section at the line, 10—10, on Figure 5.

Figure 1:
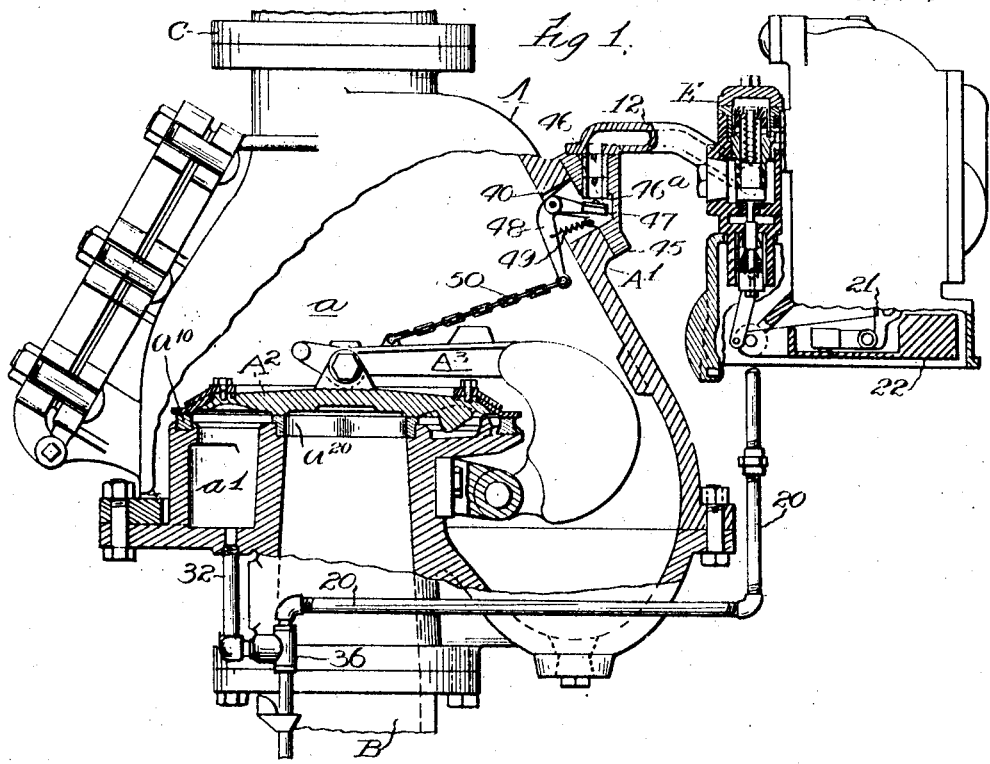
Figure 1 is a vertical section of the main valve casing of a dry pipe valve system equipped with an accelerating device, the connection of which with the dry pipe valve embodies the present invention, section being made axial with respect to the inlet and discharge pipes of the dry pipe valve casing, the accelerating device proper being shown only in outside elevation of the casing.
Figure 2:
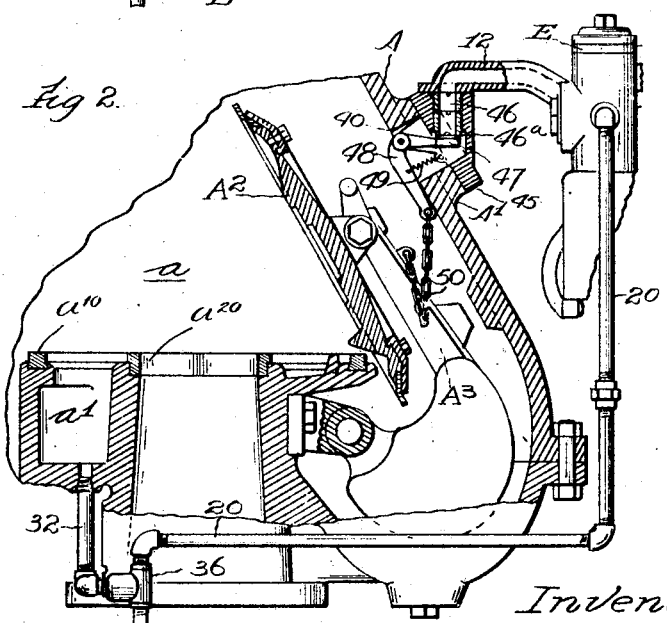
Figure 2 is a detail section in the same plane as Figure 1 of a part of the main valve casing and parts therein, showing the main valve and other parts connected therewith in different positions from those seen in Figure 1.
Figure 11:
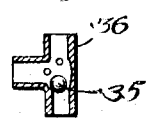
Figure 11 is a section axial with respect to both limbs of the pipe T, 36 in Figure 2.

In the structure illustrated in Figures 1 and 2 of the drawing, A, is the main valve casing which is shown connected to a water main supply pipe, B, and to the distributing pipe, C, of the sprinkler system which is not further shown but which may be understood as comprising branches leading to and equipped with sprinkler heads which are constructed for being opened for discharge of water and exposed to temperature due to fire in their vicinity. It will be understood that when a single sprinkler head is thus opened, the waste of air therethrough from the system eventually reduces the pressure in the entire air pressure region of the system so that the remaining pressure is inadequate to hold the main valve seated against the water pressure operating in the water main supply pipe, and that thereupon the main valve opens and the system is flooded with water, causing discharge of fuel from the sprinkler head or heads. And it is also well understood that the delay which is liable to occur between the opening of a single sprinkler head and sufficient reduction of pressure from that single leakage to cause the main valve to be opened by water pressure, may be so long as to permit the fire to gain dangerous headway; and that it is desirable therefore to so construct the apparatus that the response by water to the opening of even a single sprinkler head shall be as prompt as if many sprinkler heads were opened, in fact, shall be substantially immediate.

The present invention is an improvement upon certain former devices for effecting this desirable acceleration of the opening of the main valve when there is a wastage of air from the pressure region of the system which would result in opening a single sprinkler head, but which shall not so operate upon minor leakages which are liable to occur in any extended pipe system, and which would not indicate the presence of fire. The accelerating device is in large part substantially such as shown and described in my pending application No. 733,677, filed August 23, 1924, and is the same in all the different forms of embodiment and application of the present invention shown in the different groups of figures and it will be only briefly described here.

This accelerating device seen in detail in Figure 9 consists of two chambers, 10 and 11, with which the air pressure region of the system is connected by way of a pipe, 12, the connection with the accelerating device in the forms shown in Figures 1 and 2 being through a valve structure, E, functioning as hereinafter described for certain specific purposes. The two chambers, 10 and 11, are separated, as to communication between them, by a diaphragm, 13, which is exposed upon its opposite sides to the pressures existing in the two chambers respectively, which pressures are balanced under what may be called the normal conditions, and become unbalanced under conditions calling for the operation of the accelerator for its accelerating function. The valve structure in the fitting, E, controlling both the admission of pressure from the air pressure region of the system for operating the accelerator and the admission of said pressure under the main valve for opening it, admits this pressure directly and relatively freely to the chamber, 11, and indirectly and restrictedly to the chamber, 10, through a flow-restricting device, 14, which comprises a disk, 15, having a small air leak port, 16, constituting the only path of flow of air into or out of the chamber, 10—considering said chamber as comprising the duct, 17, leading from it to one side of the diaphragm, 13. In setting up the system initially, or after it has been in service for extinguishing fire, the air pressure introduced from suitable source into the system is communicated through the pipe, 12, and the valve fitting, E, and passages controlled by the valve therein, directly to the chamber, 11, and restrictedly through the leak port, 16, to the chamber, 10, but eventually so as to cause the same pressure in both chambers, 10 and 11. When air leakage occurs from the air pressure region of the system less in amount than would result from a single opened sprinkler head, and less than would indicate presence of fire, corresponding reduction of pressure is communicated to both the chambers, 10 and 11, at substantially the same rate, because the leak port, 16, is adequate to permit as rapid flow as necessary to keep up with such minor leakage. But when the leakage amounts to as much as would result from the single open sprinkler head, the pressure will be reduced in the chamber, 11, rapidly, and in the chamber, 10, very slowly, and the resulting excess of pressure remaining in the chamber, 10, over that remaining in chamber, 11, causes the diaphragm, 13, to be moved. This diaphragm operates in this movement upon a plunger, 18, having its stem operatively related to a device, 100, which extends air-tight through a wall of the chamber, 11, and exteriorly thereof operates a latch, 21, which normally upholds the weighted lever, 22, which, when released by operation of the latch, falls and operates the valve in the valve fitting, E, for admitting pressure from the air pressure region of the system through the pipe, 20, to the interseat or atmospheric pressure chamber, $a^1$, of the dry pipe valve, thereby offsetting the air pressure of the system operating upon the upper side of the valve in the chamber, $a$, over the area of said valve in excess of its area exposed to the water pressure underneath, so that the water pressure will open the valve substantially instantly as if there were only atmospheric pressure in the pressure region of the system. The pressure thus admitted under the valve is most conveniently admitted through the customary and necessary drip pipe passage, 32, through which atmospheric pressure operates under the valve in the normal condition; and in order that the higher pressure admitted for the purpose of opening the valve may thus operate, it is essential that the access of atmospheric pressure shall be cut off, otherwise the higher pressure would merely escape into the atmosphere. This is accomplished by providing a downwardly seating valve, 35, at the outflow of the drip pipe in the vertical cross of the T-fitting, 36, whose horizontal stem leads to the interseat chamber, and into the upper end of whose cross the pressure-communicating pipe, 20, is connected. With this construction the atmospheric pressure is admitted past the upwardly opening check valve, 35, in the normal condition of the device; but when the superatmospheric pressure from the system is admitted through the pipe, 20, that pressure seats the valve, 35, and is itself admitted through the horizontal stem of the T to the interseat chamber. This accelerating device, in all its features as above stated, is not a part of the present invention and any accelerating device adapted for utilizing the air pressure of the system to cause the prompt opening of the main valve for admitting water to the system, may be employed without departing from the present invention.

The present invention relates primarily to means for preventing water from entering the accelerating device when it is admitted to the system and thereby would normally have access through the passages through which the air pressure reaches the accelerating device, for it will be noticed that it is essential to the operation of the accelerating device that a conduit for air communication of the air pressure region of the system with the chambers between which the balanced pressure element, shown as a diaphragm, is situated for exposure to the opposing pressures, shall be open at all times when the system is set up for being brought into operation by the opening of a sprinkler head; and it would follow, in the absence of preventive means, that when the system is flooded due to the opening of a sprinkler head, causing eventually the opening of the main valve, the same conduit through which the air pressure reaches the accelerating device, will admit water to the device; and during the time the system is being operated for extinguishing the fire, all parts of the accelerating device might become filled with water, to the damage of the somewhat delicate parts thereof, beside making it necessary to substantially disassemble the accelerator to clear it of water and clean it of sediment and leave the parts in a dry condition for preventing rust. To avoid this defect and difficulty and prevent the access of water to the accelerator, while adapting it for free access of the air pressure necessary for its proper functioning, the connection of the accelerator with the air pressure region of the system which is made by the pipe, 12, comprises a small pocket, 40, constituting a slight extension of the main valve chamber, $a$, formed in a hollow boss, $A^1$, said pocket being closed by a cap, 45, to which the pipe, 12, is connected, registering with the outlet aperture thereof in which there is fitted a bushing, 46, which constitutes at its inner end a seat at $46^a$ for a valve, 47, carried by a bell crank lever, 48, fulcrumed at the margin of the pocket, 40, and having a spring, 49, reacting upon the bell crank lever for normally seating the valve, 47, on the seat $46^a$ at the inner end of the bushing, 46, where it will be understood it will be normally seated and held seated by the air pressure of the system operating in the main valve chamber above the main valve, in the absence of mechanical connections operating to prevent such seating and for holding said valve, 47, off its seat while the main valve is fully seated. The other arm of the bell crank lever is connected by a flexible connector, as a chain, 50, with the main valve carrying lever, $A^3$, said connector being of such length that when the main valve $A^2$ is seated and the conductor is drawn taut, the valve, 47, is withdrawn and held away from its seat against the reaction of the spring, 49, so that so long as the main valve remains seated there is free access of air pressure from the air pressure region above the main valve to the accelerator; but as soon as the main valve leaves its seat as the result of admitting air pressure from the system under it to the interseat chamber, and before as the result of such opening any considerable amount of water can pass the main valve, the slacking of the flexible connector, 50, permits the valve, 47, to be seated by the spring, 49, as well as by the super-atmospheric pressure which is maintained in the air pressure region of the system, including the main valve chamber, so that while air pressure from the system is admitted freely to the accelerator before the main valve is opened, water is excluded from the system as soon as the main valve is opened as the result of the air pressure admitted to the accelerator.

Figure 3:
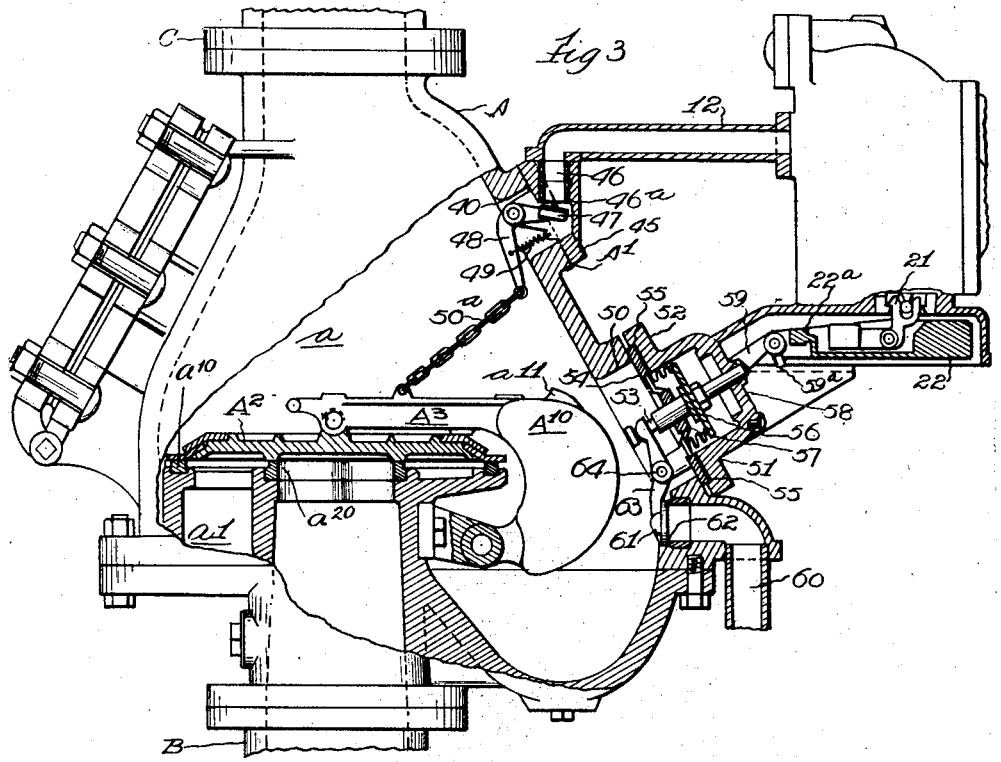
Figure 3 is a view similar to Figure 1 showing the invention applied to a dry pipe valve having the accelerating device operating for venting the system pressure.
Figure 4:
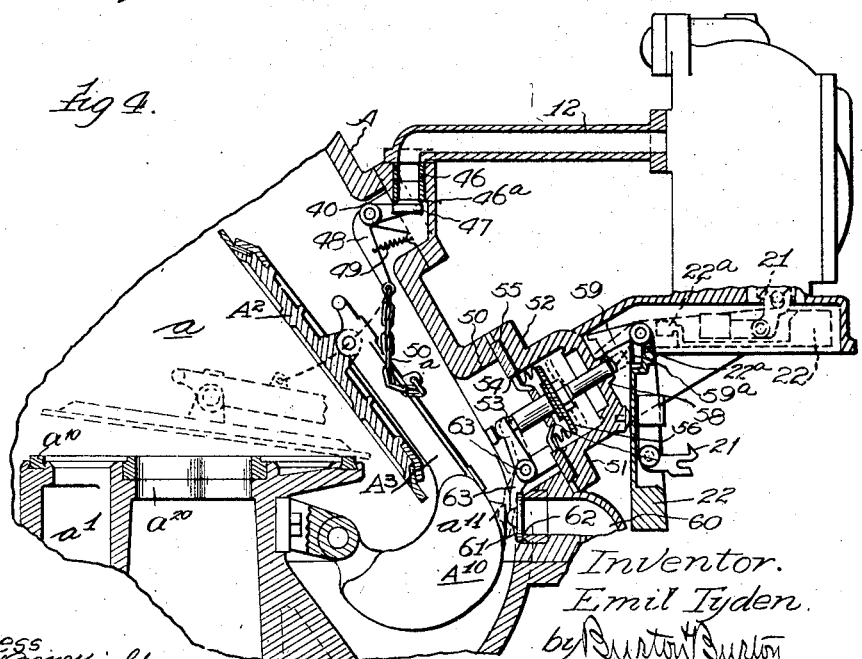
Figure 4 is a detail sectional view of a portion of the structure shown in Figure 3 showing the moving parts in different positions from those in which they appear in Figure 3.

In the forms shown in Figures 3 and 4 instead of admitting air pressure from the pressure region of the system to the interseat chamber for causing the opening of the main valve, a vent is provided from the air pressure region to relieve the pressure which has previously held the valve to its seat. For this purpose the accelerator device is identical with that above described, but it is connected with the air pressure region of the main valve directly instead of through the valve structure, E, and it operates as above described upon reduction of pressure in the system to the extent caused by the opening of a single sprinkler head for releasing the weighted lever, 22, and permitting it to fall. But instead of the falling of this lever opening communication for the system pressure to the chamber of the main valve, it opens a vent from the pressure region of the system. This vent is provided by an exhaust port, 60, leading from the air pressure region of the main valve casing and controlled by a valve, 61, seating at the margin of the port on the seat, 62, there provided. This valve is carried at one end of a lever, 63, fulcrumed on the valve casing at 64, having the other end engaged with the stem, 53, of a device of the nature of a cup-shaped bellows which may be of the character commonly known as a "sylphon". This "sylphon" device is accommodated in a fitting, 51, having a flanged foot, 52, by which it is mounted at the margin of an opening, 50, through the valve casing wall into the air pressure region of the valve casing. The bellows element has its open end flanged, the flange, 54, being clamped between the flange foot of the fitting, 51, and a packing gasket, 55. The head or bottom of the bellows cup or "sylphon" is a disk, 56, to which the stem, 53, is secured rigidly extending both outside and inside the said bellows cup and obtaining guidance at the inside in a bridge piece, 57, and at the outer side in a bridge, 58, the former clamped under the flange foot, 52, of the fitting, 51, and the latter formed unitarily with said fitting. It will be understood that this cup bellows or "sylphon" is exposed interiorily to the air pressure in the system, whereby in the absence of restraining means it will be expanded, causing the stem, 53, engaged with the valve lever, 63, to open the valve and vent the atmospheric pressure in the chamber. The stem, 53, outside the guide bridge, 58, encounters and is restrained by a bell crank lever latch, 59, pivoted on the same pivot as the weighted lever, 22, and having an arm, $59^a$, extending in position to be encountered by the lug, $22^a$, of the weighted lever in the movement of said lever which occurs when its upholding latch, 21, is released, and by that encounter the latch is rocked on its pivot for releasing the stem, 53; whereupon the pressure in the valve chamber expanding the "sylphon", whose head plate is of considerably greated area than the valve, 61, opens said valve and venting the air pressure which holds the main valve seated causes it to be opened immediately under the water pressure.

The opening movement of the main valve slacks the flexible connector, 50, and allows the valve, 47, to be seated as in the previously described construction of Figures 1 and 2. The main valve lever, $A^3$, is formed as to its heel portion, $A^{10}$, with a cam projection, $a^{11}$, which in the movement of the lever for opening the main valve encounters the valve, 61, and forces it tightly to its seat; so that the escape of water through the air vent port is prevented.

In the forms shown in Figures 5 and 6 the venting of the air pressure is effected by means of a vent port, 70, formed through the main valve, $A^2$, opening into the interseat chamber, $a^3$, between the two seats $a^{10}$ and $a^{20}$, which bound the areas of the water main pressure at one side and the system air pressure at the other side of said main valve. This interseat chamber, as is well understood, is normally open to atmospheric pressure admitted through the drain or drip pipe, 71, provided for draining from the interseat chamber the water which will accumulate therein when the main valve is open and the system is flooded for discharging through open sprinkler heads in extinguishing fire; and, as is well understood, a valve, 72, is necessarily provided for closing the port, 73, wherewith the drip pipe is connected when the main valve is opened, said valve being customarily mounted as shown in Figure 5 for seating by gravity at the port, 73, and being opened by encounter by the main valve in the seating movement of that valve with the lever, 76, by which said valve, 72, is carried as seen in detail view in Figure 10. The vent valve, 78, is carried by the lever, 79, which is mounted on the upper side of the main valve $A^2$, most conveniently on the pivot of the main valve to its carrying lever, $A^3$, and extends past the vertical plane of the fulcrum of said lever, $A^3$, terminates in position to encounter the tail, 80, of the bell crank lever, 81, (corresponding to the lever, 63, of Figure 3) in the closing movement of the main valve, $A^2$, for retracting the stem, 53, of the cup bellows or sylphon (which is identical in construction with the corresponding device shown in Figure 4) to the position at which said stem may be locked by the latch, 59, when the weighted lever, 22, is swung up to latched position in resetting the apparatus after an instance of flooding the system for extinguishing fire. A spring, 84, reacting between the lever, 79, and the main valve-carrying lever, $A^3$, may be stiff enough not to yield upon encounter of said lever, 79, with the bell crank lever arm, 81, in the operation just described, but not too stiff to yield for permitting the valve, 78, to open when the sylphon is expanded under the air pressure which occurs when the stem, 53, is released by the latch, 59. The operation of this form will be understood as identical with that of the form shown in Figures 3 and 4.

In Figures 7 and 8 there is shown a modification in which the acceleration of the opening of the main valve is effected by freely venting the system pressure which resists its opening, instead of admitting that pressure under the valve for the same purpose. In this construction the vent valve is opened by a cam on the rock shaft of the weighted lever, 22. For this modified means of operation the accelerating device of the forms previously described, shown in Figure 9, is mounted at the upper end of a valved fitting, 8, erected on the main valve casing, A. This fitting, 8, has its cavity opening through a port, 85, into an enlarged cavity, $8^b$, which extends through the open end of the fitting at its foot, $8^a$, where when the fitting is mounted by said foot on the main valve body as shown in Figure 7, the end of said enlarged cavity, $8^b$, registers with a port, $a^5$, in the side plate, $A^7$, of said main valve body, which port is controlled by a valve, $47^x$, corresponding to and operated similarly to the valve, 47, in Figure 1. The passage, 82, in the fitting, $8^x$, is further controlled by a valve, $8^c$, seating upwardly on a seat, 85, above which an atmosphere vent or exhaust port, 87, opens laterally of the fitting, $8^x$, and there may be connected at that port a pipe 86 leading to any convenient discharge point. The valve, $8^c$, is held normally seated by a spring, 89, coiled about its stem, which stem protrudes through a guide provided for it at 90, the spring being stopped at one end against said guide bearing and at the other end against a shoulder formed by an enlarged head, 91, of the stem in which there is journaled a roller, 92, with which a cam, 93, on the rock shaft of the weighted lever, 22, co-operates for thrusting the valve stem downward against the resistance of the spring 89, to open the valve $8^c$ in the falling movement of the weighted lever when it is released from the latch, 21.

Below the valve, $8^c$, there is connected to the fitting, $8^x$, a pipe, 95, which leads to the accelerating device, said pipe corresponding to the pipe, 12, of the previously described construction shown in Figures 1, 3 and 5, having the function of putting the accelerator in communication with the air pressure region of the system while the same is normally set for its purpose of being brought into operation for extinguishing fire upon the opening of the sprinkler head.

The operation of this modified construction may be understood from the foregoing description to be as follows:

Upon the reduction of pressure in the air pressure region to the extent which would occur upon the opening of a single sprinkler head the accelerator device shown in Figure 9 operates as heretofore described in connection with the earlier described structures for releasing the weighted lever, 22, and causing it to drop. In this movement of the weighted lever the cam, 93, on the rock shaft of the lever forces the valve, 8ᶜ, open and thereby affords free vent from the air pressure region of the system to the atmosphere with the result that the main valve is opened by water pressure, the valve is seated by slacking of the flexible connector, thereby closing all communication by which water might reach the accelerating device.

I claim:—

1. In a dry pipe sprinkler system in combination with a main valve casing, a water supply pipe thereto and main valve therein, an accelerator for hastening the opening of the main valve upon the occurrence of substantial air leakage from the air pressure region of the system, said accelerator comprising chambers communicating with the air pressure region of the system for being affected by the diminution of pressure due to such leakage, and means associated with the accelerator for freely venting the air pressure from said pressure region; a passage communicating leakage from the air pressure region to the accelerator, and an auxiliary valve controlling the entrance to said passage seating in the direction of the pressure from the region, and means by which the auxiliary valve is seated in the initial opening movement of the main valve.

2. In a dry pipe sprinkler system in combination with a main valve casing, a water supply pipe thereto and main valve therein, an accelerator for hastening the opening of the main valve upon the occurrence of substantial air leakage from the air pressure region of the system, said accelerator comprising chambers communicating with the air pressure region of the system for being affected by the diminution of pressure due to such leakage, means associated with the accelerator for freely venting the air pressure from said pressure region; a passage communicating leakage from the air pressure region to the accelerator, an auxiliary valve controlling the entrance to said passage seating in the direction of the pressure from said region, and connections extending between the main valve and the auxiliary valve holding the latter open when the former is seated and releasing it for closing before water passing the main valve can reach said entrance for passing into the accelerator chamber.

3. In a dry pipe sprinkler system in combination with a main valve which controls access of water to the system and with the air pressure distributing line thereof, means for accelerating the full opening of the main valve when there is substantial leakage causing reduction of pressure in the air pressure region of the system; a duct for communication of pressure from the air pressure region of the system to said accelerating means having its intake in the air pressure region of the main valve casing; a pressure outlet valve mounted in said region for seating outwardly with respect to the valve chamber in said casing at the intake of said duct; whereby the pressure in the casing tends to seat it, and connections from the main valve in said casing to said pressure outlet valve for holding the latter open when the main valve is seated and releasing it for being closed by the pressure upon the initial movement of the main valve.

4. In a dry pipe sprinkler system characterized by a movable element and means for moving it actuated by pressure derived from the air pressure region of the system through differentiated ports of access to two areas of said means, in combination with a main valve having a port through it for communication of the air pressure region above the main valve with an interseat atmospheric pressure chamber below said valve; a vent valve for controlling said port mounted upon the main valve, the main valve casing having an aperture opening from the air pressure region thereof, a member mounted for limited movement in said aperture both with and against the pressure and operating connections from said member for controlling said vent valve, said member having a part exposed for mechanical encounter outside the valve casing, means mounted outside said casing for locking said part against movement in one valve-operating direction, and connections from the said first mentioned movable element for releasing said locking means.

In testimony whereof, I have hereunto set my hand at Chicago, Illinois, this 19th day of January, 1925.

EMIL TYDEN.